(12) United States Patent
Steen

(10) Patent No.: US 11,849,669 B2
(45) Date of Patent: Dec. 26, 2023

(54) FLEXIBLE MOWER DECK

(71) Applicant: Deere & Company, Moline, IL (US)

(72) Inventor: Chad C. Steen, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 207 days.

(21) Appl. No.: 16/949,231

(22) Filed: Oct. 21, 2020

(65) Prior Publication Data

US 2022/0117154 A1  Apr. 21, 2022

(51) Int. Cl.
| | | |
|---|---|---|
| A01D 34/74 | (2006.01) | |
| A01B 73/00 | (2006.01) | |
| A01D 34/66 | (2006.01) | |
| A01D 69/06 | (2006.01) | |
| A01D 75/30 | (2006.01) | |

(52) U.S. Cl.
CPC ............ *A01D 34/74* (2013.01); *A01B 73/00* (2013.01); *A01D 34/66* (2013.01); *A01D 69/06* (2013.01); *A01D 75/306* (2013.01)

(58) Field of Classification Search
CPC ...... A01D 34/74; A01D 75/30; A01D 75/303; A01D 75/306; A01D 34/66; A01B 73/044
See application file for complete search history.

(56) References Cited

U.S. PATENT DOCUMENTS

| | | | |
|---|---|---|---|
| 3,473,302 A | 10/1969 | Caldwell | |
| 3,797,209 A | 3/1974 | Davis | |
| 4,497,160 A | 2/1985 | Mullet et al. | |
| 4,840,020 A * | 6/1989 | Oka | A01D 34/63 |
| | | | 172/395 |
| 4,858,417 A | 8/1989 | Priefert et al. | |
| 5,065,568 A * | 11/1991 | Braun | A01D 34/64 |
| | | | 56/DIG. 14 |
| 5,241,808 A | 9/1993 | Colistro | |
| 5,280,695 A | 1/1994 | Nunes, Jr. et al. | |
| 5,771,669 A | 6/1998 | Langworthy et al. | |
| 5,797,252 A * | 8/1998 | Goman | A01D 34/74 |
| | | | 56/DIG. 14 |
| 6,065,274 A | 5/2000 | Laskowski et al. | |
| 6,308,503 B1 * | 10/2001 | Scag | A01D 34/685 |
| | | | 56/16.9 |
| 6,389,786 B1 | 5/2002 | Bergsten et al. | |
| 6,494,026 B1 | 12/2002 | Schmidt | |
| 6,530,198 B2 | 3/2003 | Bergsten et al. | |

(Continued)

OTHER PUBLICATIONS

Hustler, Super104 Operators manual, p. 1-52.

(Continued)

*Primary Examiner* — Thomas B Will
*Assistant Examiner* — Julia C Tran

(57) ABSTRACT

A flexible mower deck includes a center deck with a plurality of rotary cutting blades rotated by a belt engaging a driven pulley for each blade. A first wing deck and a second wing deck are pivotably attached to a first end and a second end of the center deck. Each of the wing decks are pivotable between a lowered mowing position and a raised transport position. A height of cut mechanism on each of the first and second wing decks raises and lowers the wing deck and includes a four bar caster wheel level mechanism holding a caster wheel sleeve in front of the wing deck in vertical alignment at any height of cut.

12 Claims, 5 Drawing Sheets

(56) References Cited

U.S. PATENT DOCUMENTS

| | | | |
|---|---|---|---|
| 6,591,593 B1 | 7/2003 | Brandon et al. | |
| 7,089,722 B2 | 8/2006 | Laskowski | |
| 7,313,902 B1* | 1/2008 | Eavenson, Sr. | A01D 34/828 56/13.6 |
| 7,401,456 B2 | 7/2008 | Korthals | |
| 7,775,024 B2* | 8/2010 | Boyko | B60B 33/04 56/15.2 |
| 7,841,157 B2* | 11/2010 | Latuszek | A01D 34/661 56/6 |
| 8,042,322 B1 | 10/2011 | Wyatt | |
| 8,490,374 B2 | 7/2013 | Latuszek et al. | |
| 8,965,630 B2 | 2/2015 | Wyatt et al. | |
| 9,173,346 B2 | 11/2015 | Koike et al. | |
| 10,543,743 B1 | 1/2020 | Keller | |
| 2003/0140610 A1* | 7/2003 | Boyko | A01D 67/005 56/14.9 |
| 2004/0148917 A1 | 8/2004 | Eastwood | |
| 2006/0070366 A1* | 4/2006 | Laskowski | A01D 34/662 56/14.9 |
| 2007/0119139 A1 | 5/2007 | Hofmann et al. | |
| 2016/0316619 A1* | 11/2016 | Johanek | A01D 34/74 |
| 2018/0014460 A1 | 1/2018 | Mullet et al. | |
| 2019/0150359 A1* | 5/2019 | Gust | A01D 34/863 |
| 2019/0254228 A1* | 8/2019 | Tate | A01D 69/005 |

OTHER PUBLICATIONS

Lastec, WZ400 Gas series 3873C Owner's Manual, p. 1-70.
Lastec, WZ600 series D3780 Owner's Manual, p. 1-76.
Lastec, WZ800 series D3700 Owner's Manual, p. 1-75.
Z Master, Professional 7500-D Series Riding Mower Operators manual, p. 1-72.
Lastec, WZ600 Commercial Zero Turn Mower, p. 1-5, [retrieved on Sep. 16, 2020]. Retrieved from the Internet: <URL: https://www.lastec.com/wz600-commercial-zero-turn-mower>.
Lastec, WZ800 Commercial Zero Turn Mower, p. 1-8, [retrieved on Sep. 16, 2020]. Retrieved from the Internet: <URL: https://www.lastec.com/wz800-commercial-zero-turn-mower>.
Lastec, WZ1000 Commercial Zero Turn Mower, p. 1-7, [retrieved on Sep. 16, 2020]. Retrieved from the Internet: <URL: https://www.lastec.com/wz1000-commercial-zero-turn-mower>.

* cited by examiner

FLEXIBLE MOWER DECK

FIELD OF THE INVENTION

This invention relates generally to mower decks on zero turning radius mowers, and specifically to a mower deck that is flexible and may be used for different cutting widths.

BACKGROUND OF THE INVENTION

Zero turning radius ("ZTR") mowers have at least one independently powered drive wheel on each side of a frame. Hydrostatic transmissions transmit power to each of the left and right drive wheels, either in forward or reverse. The pair of hydrostatic transmissions, or dual hydrostatic transmission, may be driven by an internal combustion engine or other power source. The independent drive wheels allow the ZTR mower to turn on a vertical turning axis. The vertical turning axis may be centrally located between the pair of hydrostatic transmissions. A seated operator may use left and right control levers or other steering controls to control the pair of hydrostatic transmissions. ZTR mowers may be operated at ground speeds as fast as 7 mph-8 mph or more while mowing.

ZTR mowers may have mower decks as wide as 100 inches or more, often with a left wing deck and a right wing deck connected to a center deck. Most of these mower decks use a belt to engage pulleys on spindles to rotate five or more rotary cutting blades under the mower deck. However, the mower decks cannot mow at reduced widths because the belt is disengaged when one or both wing decks are pivoted up to a vertical transport position. Alternatively, some mower decks use five or more hydraulic motors to rotate the cutting blades, but the hydraulic lines may leak fluid. Additionally, the operator must stop each time to adjust the cutting height of each wing deck.

A flexible mower deck for a ZTR mower is needed that can mow at reduced widths when one or both wing decks are pivoted up to a vertical transport position. A flexible mower deck for a ZTR mower is needed that reduces the risk of hydraulic fluid leaks. A flexible mower deck for a ZTR mower is needed that allows height of cut adjustments from the operator seat.

SUMMARY OF THE INVENTION

A flexible mower deck includes a center deck having a first end and a second end, and a wing deck pivotably attached to each of the first and second ends. A height of cut mechanism on each wing deck may independently adjust the height of cut by actuating a switch in an operator station to move the wing deck relative to a front caster wheel and rear trailing wheel.

DESCRIPTION OF THE PREFERRED EMBODIMENT

Figure 1:
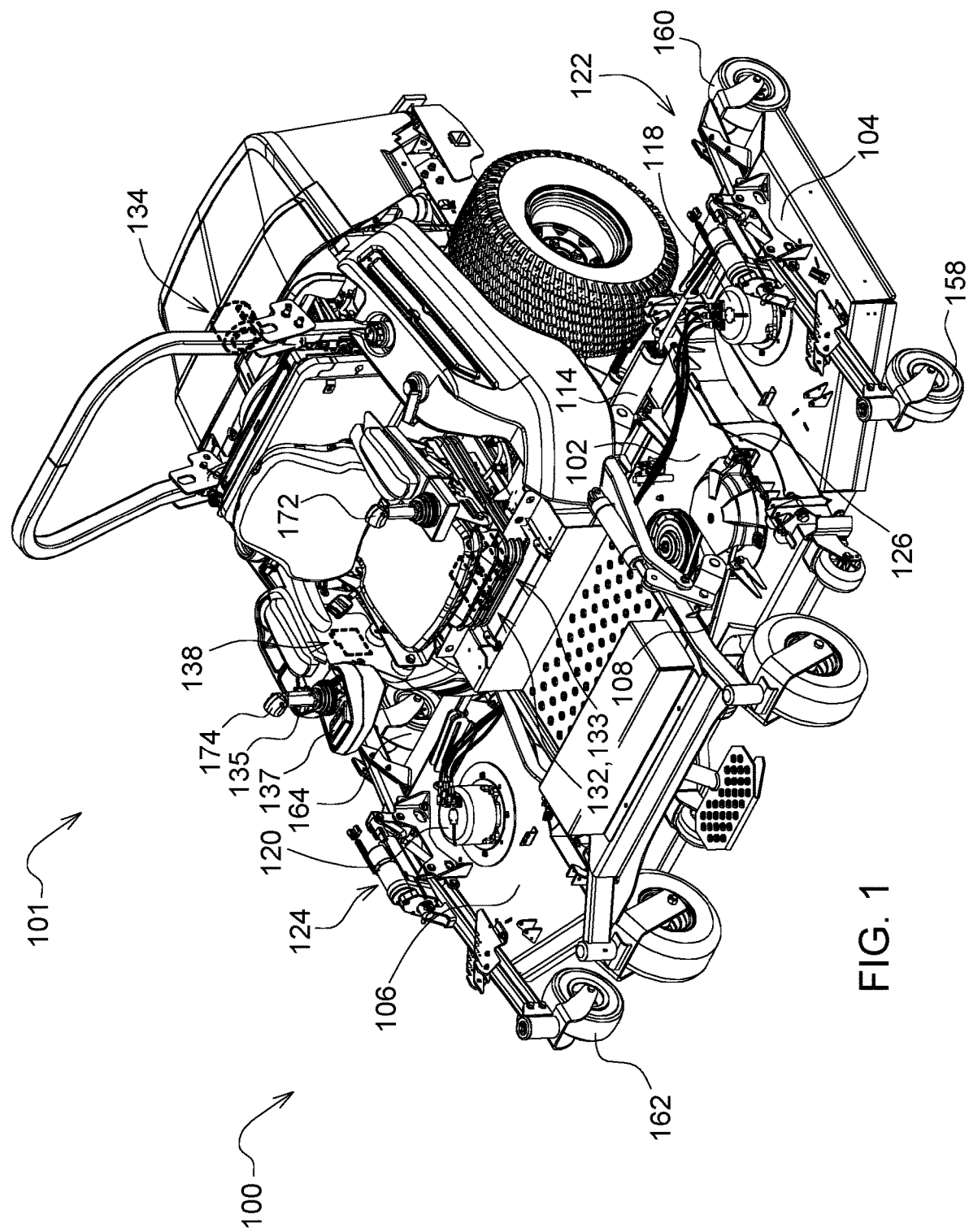
FIG. 1 is a perspective view of a zero turning radius mower with a flexible mower deck according to a first embodiment of the invention.

In one embodiment shown in FIG. 1, flexible mower deck 100 may be on zero turning radius ("ZTR") mower 101 having at least one independently powered drive wheel on each side of a frame. Hydrostatic transmissions may transmit power to each of the left and right drive wheels, either in forward or reverse. The pair of hydrostatic transmissions, or dual hydrostatic transmission, may be driven by an internal combustion engine or other power source. The independent drive wheels allow the ZTR mower to turn on a vertical turning axis centrally located between the pair of hydrostatic transmissions. A seated operator may use left and right control levers 172, 174, joysticks or other similar steering controls to control the pair of hydrostatic transmissions and mow at ground speeds as fast as 7 mph-8 mph or more. The ZTR mower also may include display panel 137 adjacent the steering controls.

Figure 2:
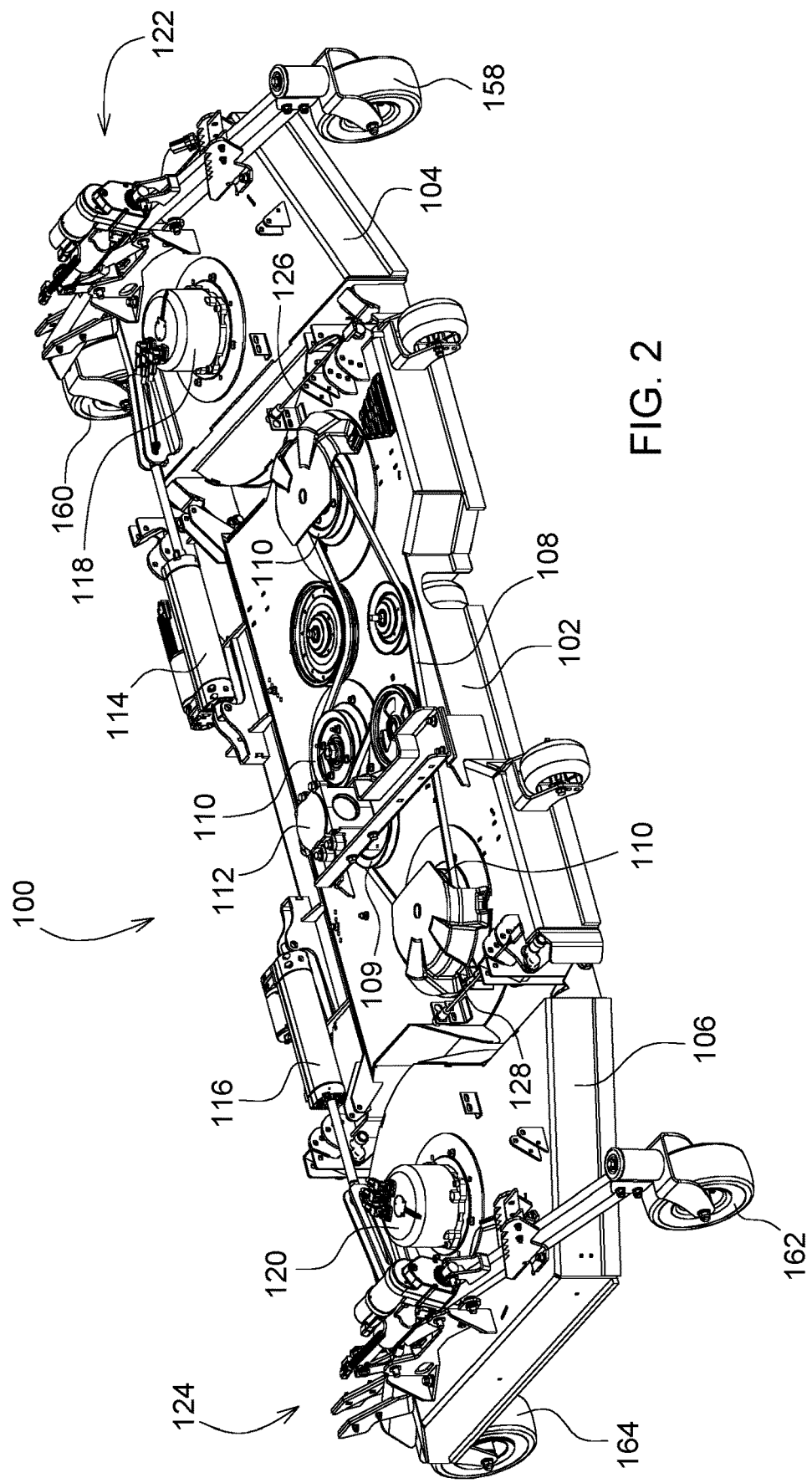
FIG. 2 is a perspective view of a flexible mower deck with both wing decks in the mowing position according to a first embodiment of the invention.
Figure 3:
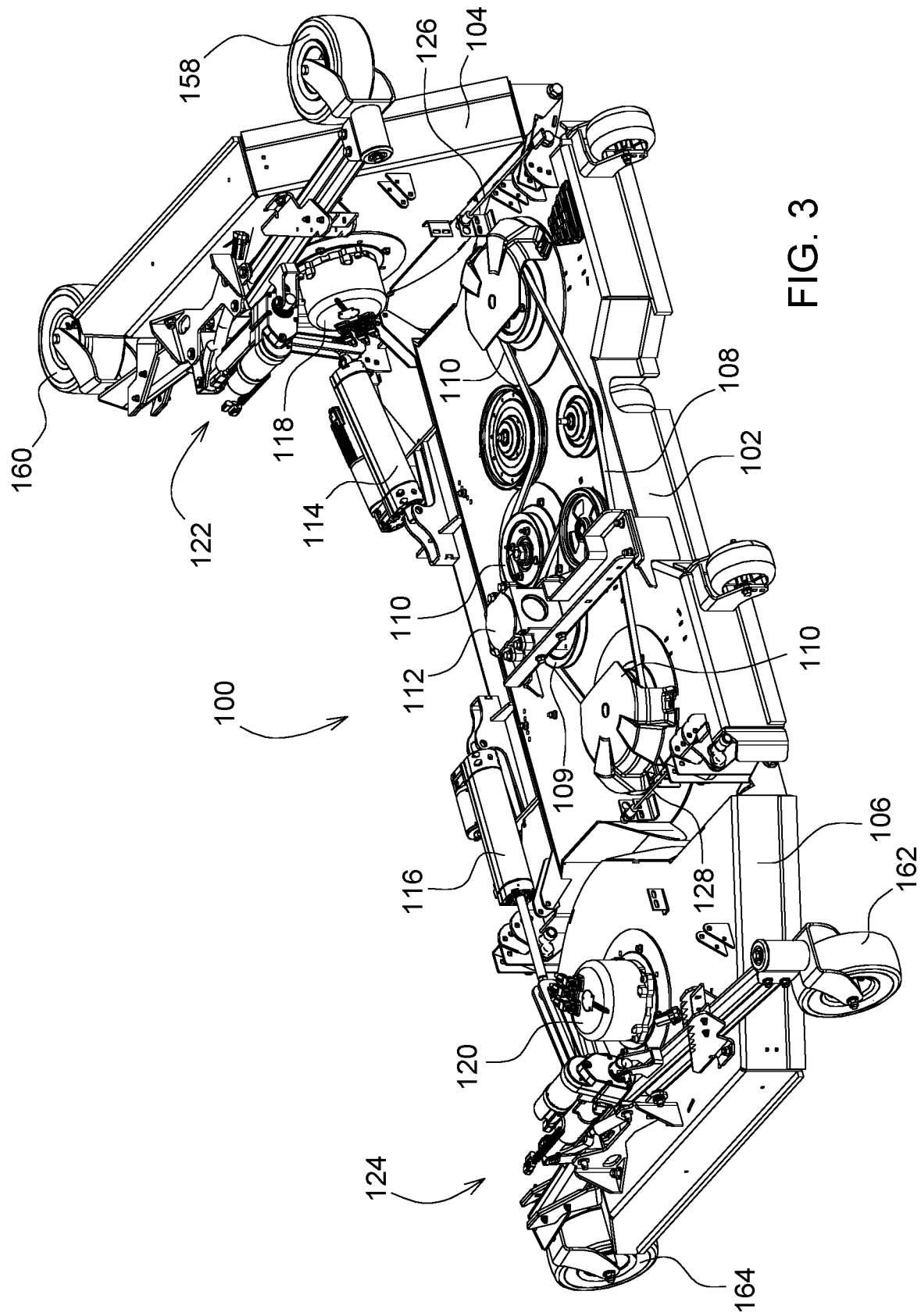
FIG. 3 is a perspective view of a flexible mower deck with one of the wing decks in a transport position according to a first embodiment of the invention.

In one embodiment, as shown in FIGS. 2 and 3, flexible mower deck 100 may include center deck 102 which may cover a plurality of rotary cutting blades mounted on spindles. A driveshaft and gearbox 112 may transmit power from the engine or other power source to drive pulley 109 on the center deck. Alternatively, a belt may be used to transmit power to the drive pulley. The drive pulley may turn drive belt 108 to rotate driven pulleys 110 on blade spindles extending through the center deck.

In one embodiment, as shown in FIGS. 2 and 3, flexible mower deck 100 may include left and right wing decks 104, 106 pivotably mounted to the left and right ends of the center deck. The wing decks may be supported by front caster wheels 158, 162 and rear trailing wheels 160, 164. Each wing deck may have a 4 kW to 8 kW electric motor 118, 120 to rotate one or more rotary cutting blades. For example, the electric blade motors 118, 120 may be electrically connected to inverters 132, 133. The inverters may be electrically connected to alternator 134 that may be belt driven by an internal combustion engine or other power source. Alternatively, a battery pack may provide electric power to the electric blade motors. Controller 138 may set the speed of the electric blade motors on the wing decks based on the sensed rotational speed of the belt driven blades under the center deck. The controller may monitor the speed of the belt driven blades under the center deck. If the controller detects an increase or drop in the speed (due to grass conditions or reduced mowing speed setting, for example), the controller may change the rotational speed of the electric blade motors to match the rotational speed of the belt driven blades. Alternatively, the rotational speed of each of the electric blade motors may be set independently of the other electric blade motor and center deck blades.

In an alternative embodiment, each wing deck may have a hydraulic motor to rotate one or more cutting blades. Each of the hydraulic blade motors may be connected to a valve and a hydraulic pump. The controller may set the speed of the hydraulic motors on the wing decks based on sensed rotational speed of the belt drive blades under the center deck. If the controller detects an increase or drop in speed, the controller may change the rotational speed of the hydraulic blade motors to match the rotational speed of the belt driven blades. Alternatively, the flexible mower deck may have operator controls to set the rotational speed of the hydraulic motors independently of each other and the center deck blades.

In one embodiment, flexible mower deck 100 may be used to mow with the center deck only, the center deck and both wing decks as shown in FIG. 2, or the center deck one wing deck as shown in FIG. 3. Lift/lower switches on each of a pair of operator control levers or joysticks 172, 174 may be used to actuate hydraulic cylinders 114, 116 or electrical actuators to independently pivot each wing deck between a mowing position and a transport position. Alternatively, lift/lower switches for the wing decks may be located in the operator station adjacent display panel 137. Each of the wing decks may be moved between the mowing position and transport position without changing the position or operation of belt 108 on the center deck. Additionally, the flexible mower deck may include position sensors 126, 128 which may provide electronic signals to controller 138 indicating if each wing deck is in the mowing position or transport position. The controller may shut off the electric blade motor if the position sensor indicates the wing deck is not in the mowing position. The deck position sensors may be non-contact metallic sensors for detecting the position of each wing deck.

Figure 4:
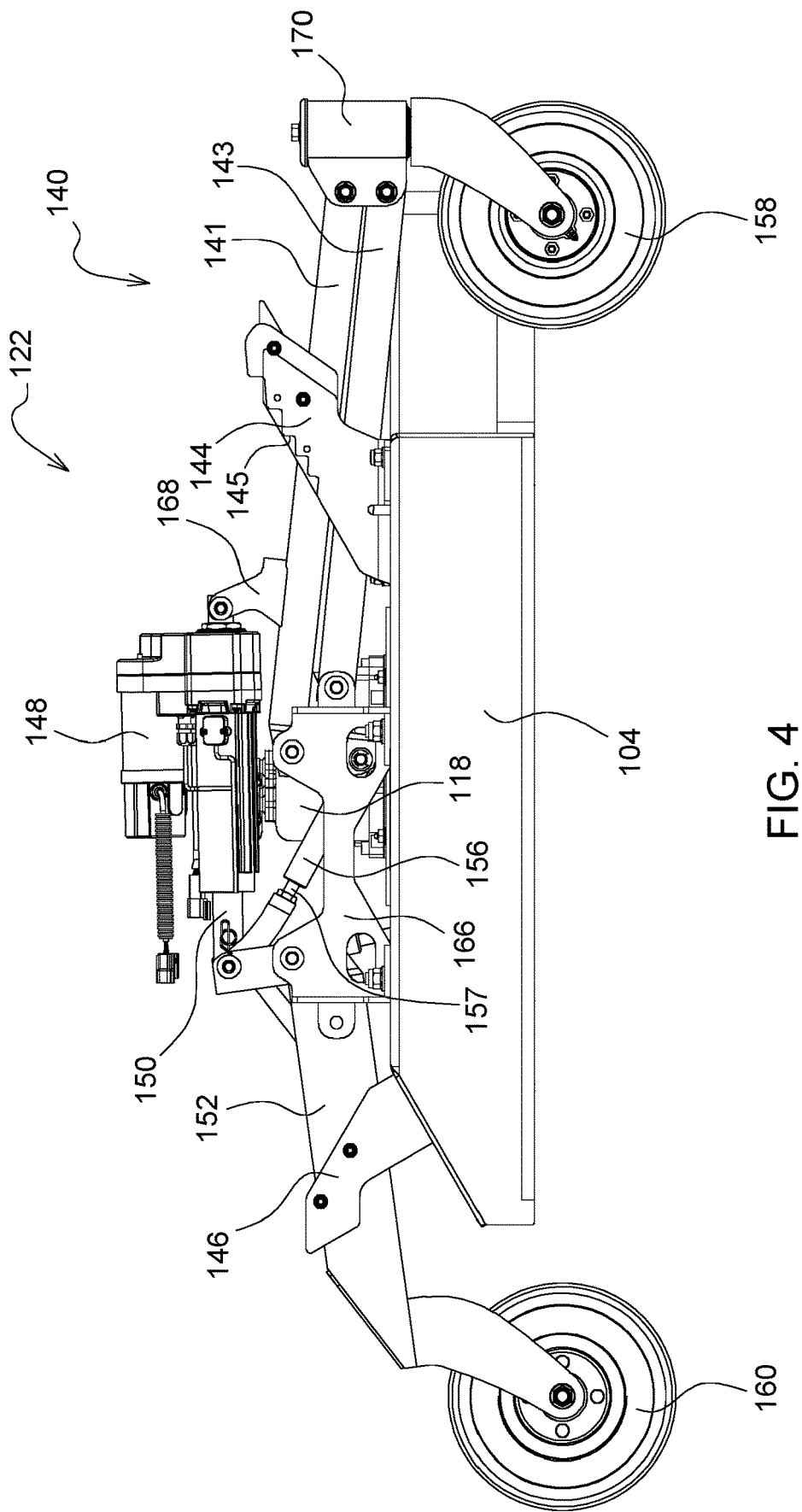
FIG. 4 is a side view of a wing deck of a flexible mower deck with a height of cut adjustment mechanism at a high height of cut setting according to a first embodiment of the invention.
Figure 5:
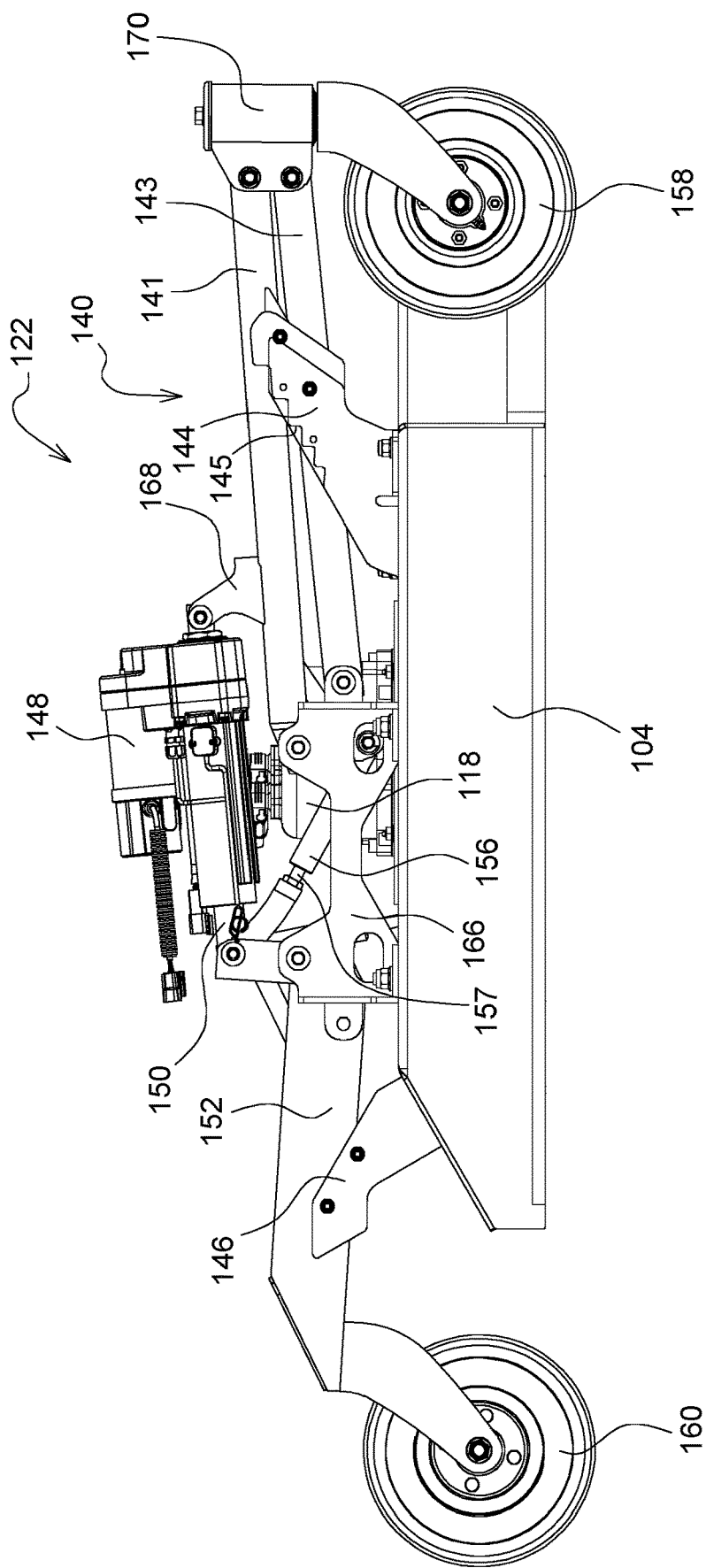
FIG. 5 is a side view of a wing deck of a flexible mower deck with a height of cut adjustment mechanism at a low height of cut setting according to a first embodiment of the invention.

In one embodiment, shown in FIGS. 4 and 5, flexible mower deck 100 may include height of cut adjustment mechanism 122, 124 on each wing deck 104, 106. Each wing deck height of cut adjustment mechanism may be operated independently using a bidirectional variable height of cut switch to extend or retract linear actuator 148. For example, each linear actuator may be electronically actuated using a switch located on control lever or joystick 172, 174. Alternatively, each linear actuator may be hydraulic or manual and may be actuated with a dial or lever in the operator station adjacent display panel 137. When actuated, the linear actuator may be extended to move a wing deck to a high height of cut setting shown in FIG. 4, or retracted to a low height of cut as shown in FIG. 5. Center deck 102 also may be raised using a foot pedal and then lowered to a desired height of cut which the operator may be set with rotatable height of cut control knob 135.

In one embodiment, the height of cut mechanism on each wing deck of flexible mower deck 100 may include four-bar caster wheel level mechanism 140. The four-bar caster wheel level mechanism 140 may support and hold front caster wheel sleeve 170 in vertical alignment at any height of cut. The four-bar caster wheel level mechanism 140 may include a pair of bars 141, 143 extending forward to the front caster wheel sleeve. Each of the pair of bars 141, 143 may pivotably connect front caster wheel sleeve 170 to center bracket 166 on the wing deck.

In one embodiment, the height of cut adjustment mechanism on each wing deck may include rear arm 152 which supports rear trailing wheel 160 behind the wing deck. Rear arm 152 may be L-shaped and pivotably mounted to center bracket 166 on a pivot axis between a forward end which may be connected to the extendable shaft 150 of linear actuator 148, and a rear end which may be connected to rear trailing wheel 160. Rear arm balancer 156 may provide a linkage between rear arm 152 and the four-bar caster wheel level mechanism 140 to ensure that the front caster wheel and rear trailing wheel move together and each wing deck stays at the specified rake angle for any height of cut position. Rake angle refers to any difference in deck height from the front to rear of the deck, and may be set by adjusting the length of rear arm balancer 156 using threaded extender 157.

In one embodiment, as shown in FIGS. 4 and 5, the height of cut mechanism on each wing deck may include front and rear guides 144, 146 mounted to the wing deck surface adjacent the four bar caster wheel level mechanism and the rear arm respectively. The front guide may help support and stabilize the pair of bars in the four-bar caster wheel level mechanism, and the rear guide may help support and stabilize the rear arm, to prevent twisting or bending. Additionally, the front guide also may include a visible height indicator, such as a series of steps or marks 145, showing the wing deck height of cut position.

Having described the preferred embodiments, it will become apparent that various modifications can be made without departing from the scope of the invention as defined in the accompanying claims.

The invention claimed is:

1. A flexible mower deck, comprising:
a first wing deck and a second wing deck pivotably attached to a first end and a second end of a center deck, each of the wing decks pivotable between a lowered mowing position and a raised transport position;
an electric blade motor on each of the first and second wing decks, each motor having a rotational speed that is set based on a sensed rotational speed of a plurality of belt driven blades under the center deck for mowing if the first and second wing decks are in the lowered mowing position; and
a height of cut mechanism on each of the first and second wing decks that raises and lowers the wing deck independently of a center deck lift mechanism by pivoting a four bar caster wheel level mechanism holding a caster wheel sleeve in front of the wing deck and pivoting a rear arm behind the wing deck.

2. The flexible mower deck of claim 1 wherein each of the height of cut mechanisms includes a linear actuator.

3. The flexible mower deck of claim 2 further comprising a height of cut switch on each of a pair of operator controls to extend and retract each of the linear actuators.

4. The flexible mower deck of claim 1 wherein the height of cut mechanism includes a front caster wheel supported by the four bar caster wheel level mechanism and a rear trailing wheel supported by the rear arm; and a rear arm balancer linking the rear arm to the four bar caster wheel level mechanism.

5. A flexible mower deck, comprising:
a pair of electrical switches in an operator station of a zero turning radius mower, each switch connected to a linear actuator on a wing deck that extends or retracts in response to actuation of the switch; and
a four bar caster wheel level mechanism attached between the wing deck and a sleeve for a front caster wheel;
a rear arm attached between the wing deck and a rear trailing wheel;
wherein the extension or retraction of the linear actuator pivots the four bar caster wheel level mechanism and the rear arm relative to a center bracket on the wing deck to change a height of cut of the wing deck independently of a center deck lift mechanism; and
a rotary blade under each wing deck rotated by a motor having a rotational speed based on a sensed rotational speed of at least one rotary blade under a center deck between the pair of wing decks.

6. The flexible mower deck of claim 5 further comprising a link connecting between the four bar caster wheel level mechanism and the rear arm and that maintains a constant rake angle of the wing deck.

7. The flexible mower deck of claim 5 further comprising a front guide and a rear guide mounted to the wing deck adjacent the four bar caster wheel level mechanism and the rear arm respectively.

8. The flexible mower deck of claim 7 wherein the front guide includes a plurality of steps showing the wing deck height of cut position.

9. A flexible mower deck, comprising:
- a center deck having a first end and a second end;
- a wing deck pivotably attached to each of the first and second ends; and
- a height of cut mechanism on each wing deck for independently adjusting the height of cut by actuating a switch in an operator station to pivot a front caster wheel and a rear trailing wheel relative to the wing deck independently of a center deck lift mechanism; and
- a controller setting a rotational speed of a rotary blade under each wing deck based on a sensed rotational speed of a rotary blade under the center deck.

10. The flexible mower deck of claim 9 wherein the height of cut mechanism on each wing deck includes a linear actuator.

11. The flexible mower deck of claim 9 wherein the front caster wheel is connected to the wing deck by a four bar caster wheel level mechanism.

12. The flexible mower deck of claim 9 wherein each height of cut switch is on a control lever in the operator station of a zero turn mower.

\* \* \* \* \*